March 6, 1956  M. DE HAAS  2,737,073

TAILSTOCK ACTUATING DEVICE

Original Filed Sept. 24, 1947  2 Sheets-Sheet 1

INVENTOR.
Max De Haas
BY Woodling and Krost,
Attorneys

March 6, 1956  M. DE HAAS  2,737,073
TAILSTOCK ACTUATING DEVICE
Original Filed Sept. 24, 1947  2 Sheets-Sheet 2

INVENTOR.
Max De Haas
BY Woodling and Kroot,
Attorneys

United States Patent Office 2,737,073
Patented Mar. 6, 1956

2,737,073

TAILSTOCK ACTUATING DEVICE

Max De Haas, Avon Lake, Ohio, assignor to The Monarch Machine Tool Company, a corporation of Ohio Original application September 24, 1947, Serial No. 775,873. Divided and this application October 29, 1951, Serial No. 254,000

4 Claims. (Cl. 82—31)

My invention relates to machine tools in general, and more particularly to a power actuated tailstock for lathes.

My device may be used with freely rotating tailstock centers, usually referred to as live centers, or with nonrotative centers known as plain centers.

An object of my invention is to provide an actuating device for a tailstock center which may be employed to produce an active pressure upon a workpiece by a live center tailstock, or which may be employed to slightly back off the tailstock with reference to the workpiece without backlash when a plain center is used.

Another object of my invention is to provide a power driven tailstock center positioning device.

Another object of my invention is to provide precision control for a hydraulic tailstock positioning device.

Another object of my invention is to provide a servomotor between a manual control and the tailstock center for positioning the center without backlash.

Still another object of my invention is to provide a hydraulic power positioning device and a precision control for the power positioning device wherein one part of the control is moved a precisely controllable amount and in so moving starts movement of the power device, and thereafter the power device moves another part of the control to automatically shut off the control upon moving to the desired position.

A still further object of my invention is to provide a high speed and a vernier precision movement means to precisely position the one part of the control that operates the hydraulic power positioning device and starts movement of the power device.

Other objects and a fuller understanding of my invention may be had by referring to the following description and claims, taken in conjunction with the accompanying drawing, in which:

Basically, my invention is directed to a power positioning device and control mechanism to accurately position a tailstock center and comprises a stationarily mounted piston and a longitudinally reciprocable cylinder about the piston. The cylinder carries the tailstock center. The piston therefore provides two separate chambers within the cylinder, and the cylinder may be longitudinally reciprocated relative to the piston by introducing fluid under pressure into a selected one of the chambers and exhausting fluid from the other chamber.

The position of the cylinder relative to the piston is precisely controlled by a valve member having a body and an internal member longitudinally movable relative to one another to direct fluid to the chambers within the cylinder and exhaust fluid therefrom. In the embodiment of my invention illustrated herein, the body of the valve is interconnected with the cylinder and reciprocates longitudinally therewith. The internal member of the valve is manually positionable relative to the tailstock device. Therefore, by manually moving the internal member of the valve, fluid may be directed to a selected one of the chambers and cause the cylinder to move in a selected direction. This movement of the cylinder carries the body portion of the valve a like distance in the same direction and therefore repositions the valve body portion relative to the internal member to shut off the flow of fluid to the selected chamber and stop movement of the cylinder. Therefore, the movement of the cylinder can be precisely controlled by moving the internal member of the valve.

Figure 1:
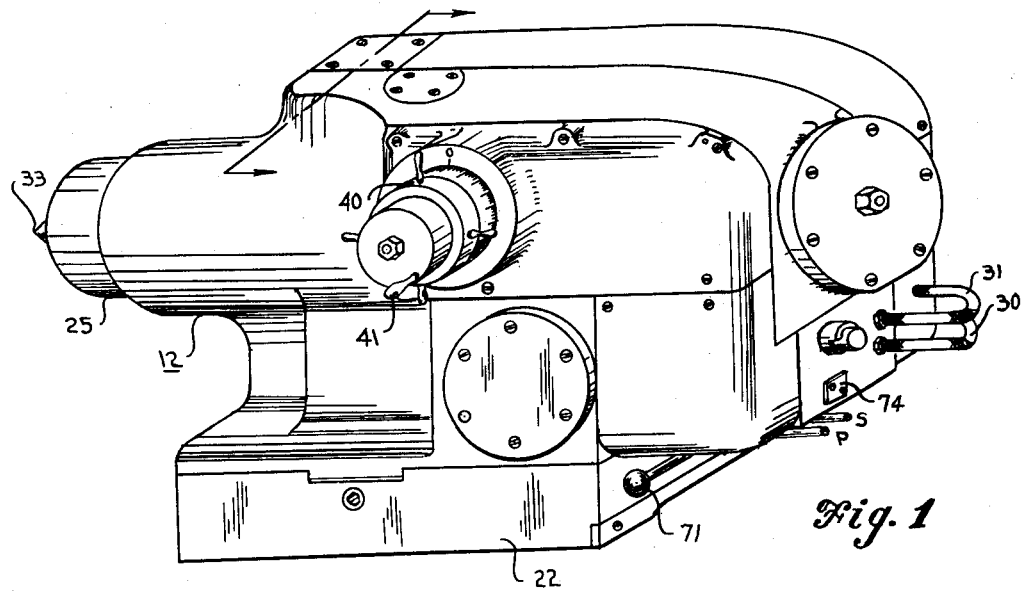
Figure 1 is a perspective view of a tailstock for a lathe, employing the principles of my invention.

In the Figure 1, I illustrate my tailstock device having a base 22 adapted to reciprocably ride on the ways of a lathe. This tailstock device is equipped with my improved power positioning device and control mechanism to accurately position a center 33. The dead center 33 is positioned by movement of either a high speed handle 40, or a vernier handle 41.

Figure 2:
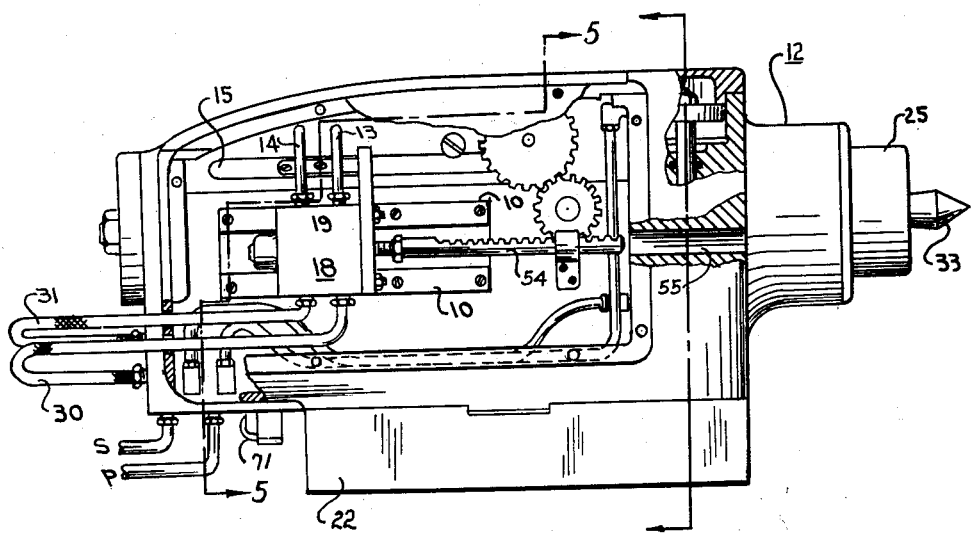
Figure 2 is an elevational view of the tailstock from the side opposite that of Figure 1, with cover plates removed to expose the mechanism therein.
Figure 3:
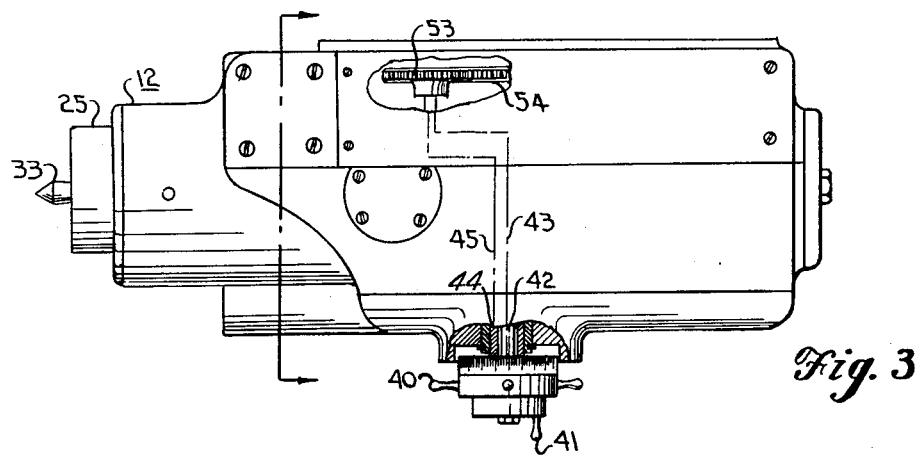
Figure 3 is a top view of the tailstock with portions of the enclosure broken away to illustrate the high speed and vernier precision movement means.
Figure 4:
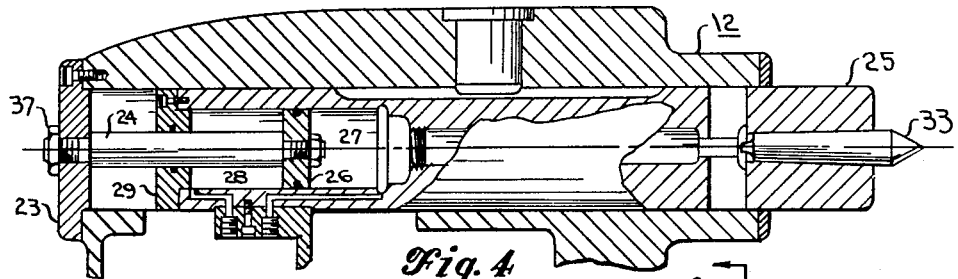
Figure 4 is a view of the actual center and actuating mechanism, as taken through line 4—4 of Figure 5.

In Figure 4 of the drawings, I illustrate my improved power positioning device, and in the Figures 2 and 3, I illustrate the relationship thereof with the precision control device.

In the illustration, the reference character 25 indicates a cylinder or quill which is longitudinally movable with reference to the lathe bed. The cylinder 25, in this particular embodiment, is employed to carry the center 33 of a machine tool lathe tailstock. A piston 26 is mounted within the cylinder 25, and thereby divides the interior of the cylinder 25 into a forward chamber 27 and a rear chamber 28. The cylinder 25 is provided with an end wall 29, and in the practice of my invention, a piston rod 24 extends from the piston 26 through the end wall 29 to the exterior of the cylinder 25. It is necessary to provide the usual caution against leakage by employing suitable packing between the end wall 29 and the cylinder 25, and between the end wall 29 and the piston rod 24. The piston rod 24 extends through an opening in the end wall 29 and is secured to a stationary plate 23 by means of a shoulder abutting against one side of the stationary plate 23 and by a securing nut 37 threadably engaged to the other end. That is, the piston rod 24 is adapted to extend through the end wall 29 as illustrated in the Figure 4 to engage the stationary plate 23 and the securing nut 37 is threaded on the end thereof and adapted to draw the piston rod 24 tight in relation to the stationary plate 23. Therefore, the cylinder 25 is adapted to reciprocate, and the piston 26 is secured against movement, which constitute members of a prime mover.

Figure 6:
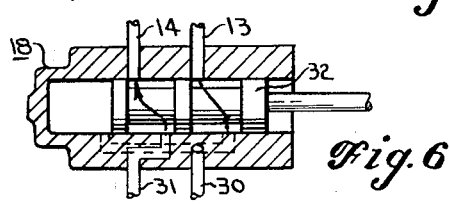
Figure 6 is a sectional view of the precision control valve device in a position to retract the power driven positioning device.
Figure 7:
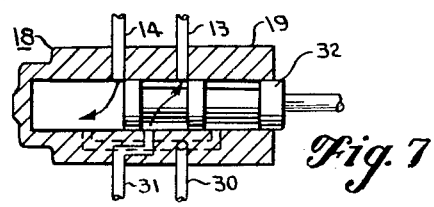
Figure 7 is a sectional view of the precision control valve device in a position to advance the power driven positioning device.
Figure 5:
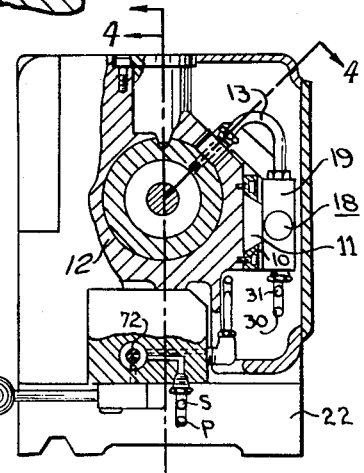
Figure 5 is a view through the line 5—5 of Figure 2 of the internal mechanism of the tailstock.
Figure 8:
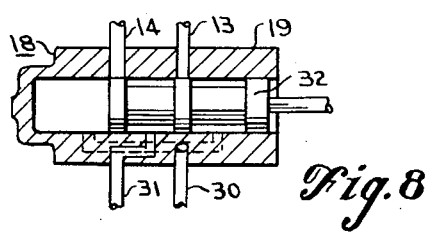
Figure 8 is a sectional view of the precision control valve device in a stop position to arrest movement of the power driven positioning device.

The cylinder 25 is supported for longitudinal movement in a frame 12 of the tailstock. The frame 12, therefore, guides and supports the cylinder 25 as it moves to position the center 33. As illustrated in the Figures 2 and 5, I have provided a dovetail way 10 secured to the frame 12, and a dovetail 11 adapted to slide in the dovetail way 10. A valve or valve means 18, as best illustrated in Figures 6, 7 and 8, having a valve body 19 and a valve member 32 is employed to control the flow of fluid into the chambers 27 and 28. The valve body 19 is mounted on the dovetail 11, and is thereby adapted to reciprocate with the dovetail 11. In the Figures 2 and 5 I illustrate fluid conduits 13 and 14 which are employed to conduct fluid from the valve body 19 to and from the chambers 27 and 28, respectively. The conduits 13 and 14 are of the inflexible type, and are secured to the valve body 19 at one end thereof and to the cylinder 25 at the other end thereof. Therefore, as the cylinder 25 moves forward and backward, the valve body 19 is carried along an equal distance. In other words, the cylinder 25 and the valve body 19 move as a unit with the dovetail 11 and the dovetail way 10 serving as slidable carriage means. In the Figure 2 of the drawing, it may be seen that a longitudinal opening 15 has been provided in the frame 12 to allow the longitudinal movement of the supply conduits 13 and 14 along with the movement of the cylinder 25.

In the embodiment of my invention illustrated, I have chosen to mount the valve body 19 to move correspondingly to movement of the movable cylinder 25, and to mount the valve member 32 for manual adjustment relative to the frame 12, and consequently relative to the valve body 19. Of course, the converse arrangement could be adapted to operate equally well. As may be seen in the Figures 6, 7 and 8, the valve member 32 may be positioned relative to the valve body 19, and thereby direct the fluid into a selected one of the chambers 27 or 28, and cause the cylinder 25 to advance or retract the center 33. A supply line 31 from a fluid pressure pump is provided to supply fluid under pressure to the valve 18, and an exhaust header 30 is provided to return the exhausted fluid to the source of supply. Thus, as illustrated in the Figure 7, for example, if the valve member 32 is moved to the illustrated position, oil under pressure will be supplied through the supply line 31 to the fluid conduit 13 and hence to the chamber 27. Fluid pressure in the chamber 27, will cause the cylinder 25 to advance the center 33. Any fluid in the chamber 28 is then exhausted through the fluid conduit 14 to the exhaust header 30 and back to the source of supply. However, advancement of the cylinder 25 will carry the valve body 19 therealong, and thus move the valve body 19 into the position illustrated in the Figure 8. Of course, conduits 13 and 14 are closed off by the valve member 32 in the illustration of Figure 8, and therefore further movement of the cylinder 25 is stopped. Thus, the distance which the operator of my improved tailstock desires to move the center 33 may be very accurately controlled by accurately moving the valve member 32. The reverse operation, that is to retract the center 33, may be accomplished by moving the valve member 32 in an opposite direction, as illustrated in Figure 6 of the drawing. Such a movement would allow fluid under pressure to pass from the supply line 31 into the fluid conduit 14 and hence into the chamber 28. Fluid is then exhausted from the chamber 27 through the fluid conduit 13 and out through the exhaust header 30 to the source of supply. Such a valving action will cause the cylinder 25 to retract until the valve body 19 is carried along to the position illustrated in the Figure 8.

In the Figure 3 of the drawings, I illustrate my improved control for manually moving the valve member 32. A rack 54 driven by a gear 53 is adapted to actuate the valve member 32, and the rack 54 is in turn actuated by the high-speed control handle 40 and the vernier low-speed control handle 41 through suitable gearing mechanism.

I illustrate a shaft 42 adapted to be driven by the handle 41. Any suitable vernier, slow speed drive, or feed mechanism may be employed to extend from the shaft 42 and drive the gear 53. I therefore illustrate the vernier drive by the dot-dash line 43.

A tubular shaft or sleeve 44 extends about the shaft 42 and is adapted to be driven by the handle 40. Any suitable high speed, or direct drive, or traverse mechanism may be employed to extend from the tubular shaft or sleeve 44 and drive the gear 53. I therefore illustrate the high speed drive by the dot-dash line 45. The rack 54 when actuated by the gear 53 is adapted to project into a longitudinal opening 55.

By the provision of my high speed drive handle 40, the operator of the tailstock device may position the valve member 32 rapidly in the direction that the center 33 is to be moved. After the center 33 has been positioned close to the desired position it is to occupy, the operator may use the vernier handle 41 and position the valve member 32 a very slight amount to cause an exceedingly small movement of the center 33. In fact, by use of the vernier handle 41, the valve member 32 may be positioned to cause the cylinder 25 and center 33 to move only a very few thousandths of an inch.

When used with the live center, the center may be advanced tightly into contact with the work piece, and may be held tightly in contact therewith by advancing the valve member 32 further than the contact of the center with the work piece will allow the cylinder to advance.

There is no mechanical back lash to be reckoned with between the cylinder 25 and the piston 26 as there is with a mechanical tailstock device. Therefore, when the cylinder 25 is employed to move a plain center, after the plain center has been moved into tight contact with a work piece, the cylinder 25 may be reversed a few thousandths of an inch to relieve the pressure. In my device, the cylinder and piston are of a servo-motor type, and there is no back lash to cause inaccurate positioning of the center 33.

Thus, my improved device may be used to actuate either a live or plain center. When used for a live center, the valve 18 may be moved to cause the cylinder 25 to produce an active pressure upon a work piece. When used with a plain center, on the other hand, the center may be slightly backed off with reference to the work piece to relieve the pressure.

In the Figure 2 of the drawings, it will be noted that the supply line 31 and the exhaust line 30 are flexible tubing of a well known type, in order to provide flexible couplings between the source of supply and the valve 18.

To summarize the operation of positioning the center 33, the operator positions the valve member 32 relative to the valve body 19 or the valve 18 in order to cause a flow of fluid under pressure to either the chamber 27 or 28 within the cylinder 25. By so positioning the valve member 32, fluid will flow either as illustrated in the Figure 6 of the drawing, or Figure 7 of the drawing, to direct the fluid under pressure to the selected chamber. Accordingly, the cylinder 25 moves in a predetermined direction. As the cylinder 25 moves in the predetermined direction, it carries the valve body 19 therealong by means of the interconnecting fluid conduits 13 and 14. Thus, the valve body is carried to the shut-off position illustrated in Figure 8 and further movement is stopped. The valve body 19 follows the valve member 32, and therefore accurate positioning of valve member 32 is the control for positioning the cylinder 25. The fluid conduits 13 and 14 are rigid and secured at one end to the cylinder 25 and at the other end to the valve body 19. Of course, the fluid conduits 13 and 14 also serve to conduct fluid to and from the chambers 27 and 28, as well as serving as connecting means to carry the valve body 19 along with the movement of the cylinder 25. Accordingly, my invention comprises hydraulic power positioning device and a precision control for the power positioning device wherein one part of the control is moved a precisely controllable amount and in so moving starts movement of the power device, and thereafter the power device moves another part of the control to automatically shut off the control upon moving to the desired position.

After having positioned the center 33 in exactly the desired position, it is desirable, and very often necessary, to clamp or lock the cylinder 25 against movement as the result of outside forces acting upon the center 33. Mechanical means have long been used for this purpose in the conventional tailstock devices. However, I have developed a novel and useful clamp means to hold the cylinder 25 in position. The preferred embodiment of the clamp means is illustrated in my parent application.

With the arrangement of the power actuating mechanism which may be controlled at a high speed by the handle 40, and at a low speed by the handle 41, to position a center 33, and by the provision of the clamping or locking mechanism, described in my parent case, to hold the actuating mechanism and the center 33 in a selected position by active hydraulic force, I have provided a tailstock device for the industry which will permit a degree of accuracy and ease of operation heretofore unknown in the machine tool trade.

This application is related to my case, entitled Tailstock Carriage and Clamping Means, filed September 24, 1947, Serial Number 775,936, now Patent Number 2,540,586, and assigned to the same assignee.

This application is a true division of application Serial No. 775,873 filed September 24, 1947, by Mack De Haas for Tailstock Spindle Clamping Device, now Patent No. 2,636,579.

Although I have described my invention with a certain degree of particularity in its preferred form it is understood that the present disclosure of the preferred form has been made only by way of example and that numerous changes in the details of construction and the combination and arrangement of parts may be resorted to without departing from the spirit and the scope of the invention as hereinafter claimed.

I claim:

1. In combination, a tailstock center, a servo-motor adapted to longitudinally position said center, and precision control means for said servo-motor, said precision control including a valve having a first member thereof movable as a unit with said servo-motor, and said valve having a second member manually positionable, said first and second members of the valve having a first relative position for directing fluid for the servo-motor, a second relative position for directing fluid for the servo-motor, a third relative position for stopping the flow of fluid for the servo-motor, high speed means and vernier means cooperatively arranged to manually position said second member of the valve relative to the said first member, movement of the second member of the valve to the first position relative to the first member of the valve directing fluid to impart movement of the servo-motor in the direction of movement of the second member of the valve and thereby carry the center and the first member of the valve therealong to move the first member of the valve into said third position relative to the second member of the valve and stop further relative movement, movement of the second member of the valve to the second position relative to the first member of the valve directing fluid to impart movement of the servo-motor in the direction of movement of the second member of the valve and thereby carry the center and the first member of the valve therealong to move the first member of the valve into said third position relative to the second member of the valve and stop further relative movement.

2. In a tailstock for a lathe, a frame, a quill translatable in said frame, said quill being keyed to said frame, a servomotor having first and second elements, one of said elements being a cylinder and the other element being a piston in said cylinder, said first element being fastened to said quill and said second element being fastened to said frame; a valve for controlling said servomotor, said valve having first and second relatively movable valve parts, one of said parts being a valve body and the other of said parts being a valve member, said valve body being connected to opposite ends of said cylinder by conduits, said first valve part being slidably mounted on said frame and rigidly connected to said first element; a manually operable vernier drive mechanism and a manually operable traverse drive mechanism, both said drive mechanisms being connected to said second valve part, whereby manual operation of either of said drive mechanisms causes relative movement of said valve parts which causes relative movement of said servomotor elements which causes said quill to move in said frame.

3. In a tailstock for a machine tool, a frame, a quill translatable in said frame, a servomotor having first and second elements, one of said elements being a cylinder and the other element being a piston in the cylinder, said first element being fastened to said quill and said second element being fastened to said frame; a valve for controlling said servomotor, said valve having first and second relatively movable valve parts, one of said parts being a valve body and the other of said parts being a valve member within said valve body, said valve body being connected to opposite ends of said cylinder by conduits, said first valve part being slidably mounted on said frame and rigidly connected to said first element; a manually operable feed drive mechanism and a manually operable traverse drive mechanism, both of said mechanisms being connected to said second valve part, whereby operation of either of said valve parts causes said quill to move in said frame.

4. In a tailstock for a machine tool, a frame, a quill translatable in said frame, a servomotor having first and second elements, one of said elements being a cylinder and the other element being a piston in the cylinder, said first element being fastened to said quill and said second element being fastened to said frame; a valve for controlling said servomotor, said valve having first and second relatively movable valve parts, one of said parts being a valve body and the other of said parts being a valve member within said valve body, said valve being connected to opposite ends of said cylinder by conduits, first and second manual drive mechanisms, both of said mechanisms being connected to said valve to relatively move said first and second valve parts, whereby operation of either of said drive mechanisms causes said quill to move in said frame, and means interconnecting said quill and said valve to relatively move said first and second valve parts.

References Cited in the file of this patent

UNITED STATES PATENTS

| | | |
|---|---|---|
| 1,753,870 | Schellens | Apr. 8, 1930 |
| 1,791,392 | Trefethen | Feb. 3, 1931 |
| 1,965,867 | Vickers | July 10, 1934 |
| 2,118,020 | Curtis | May 17, 1938 |
| 2,345,531 | De Ganahl | Mar. 28, 1944 |
| 2,372,692 | Svenson | Apr. 3, 1945 |
| 2,545,858 | Pesqueira | Mar. 20, 1951 |